United States Patent [19]

Castiglia et al.

[11] Patent Number: 5,026,288

[45] Date of Patent: Jun. 25, 1991

[54] ILLUMINATED EDUCATIONAL BLOCKS

[76] Inventors: Helen Castiglia, 7 Linden La.; Joseph Cardamone, 47 Musket Dr., both of, Shirley, N.Y. 11967

[21] Appl. No.: 364,870

[22] Filed: Jun. 12, 1989

[51] Int. Cl.⁵ .............................................. G09B 5/00
[52] U.S. Cl. .................................. 434/169; 434/201; 434/335; 273/153 R; 273/157 R
[58] Field of Search ................. 434/201, 96, 169, 208, 434/150, 153, 282, 335, 340, 341; 273/237, 238, 153 R, 157 R, 156

[56] References Cited

U.S. PATENT DOCUMENTS

| | | | |
|---|---|---|---|
| 2,656,617 | 10/1953 | Composto | 434/169 X |
| 3,314,165 | 4/1967 | Shreck et al. | 434/201 X |
| 3,854,725 | 12/1974 | Cluck | 273/238 |
| 4,023,807 | 5/1977 | Santianni | 273/238 |
| 4,391,447 | 7/1983 | Dudley | 273/238 |
| 4,464,120 | 8/1984 | Jensen | 434/201 X |
| 4,893,817 | 1/1990 | Shilo | 434/340 |

Primary Examiner—Robert Bahr
Assistant Examiner—Jennifer L. Doyle
Attorney, Agent, or Firm—Alfred M. Walker

[57] ABSTRACT

An educational, decorative, illuminated block set is provided having a low voltage matrix form mounting apparatus for the blocks, so that the blocks can be selectively illuminated if placed in a pre-arranged order of alphabet symbol or number assigned to each of the blocks.

4 Claims, 1 Drawing Sheet

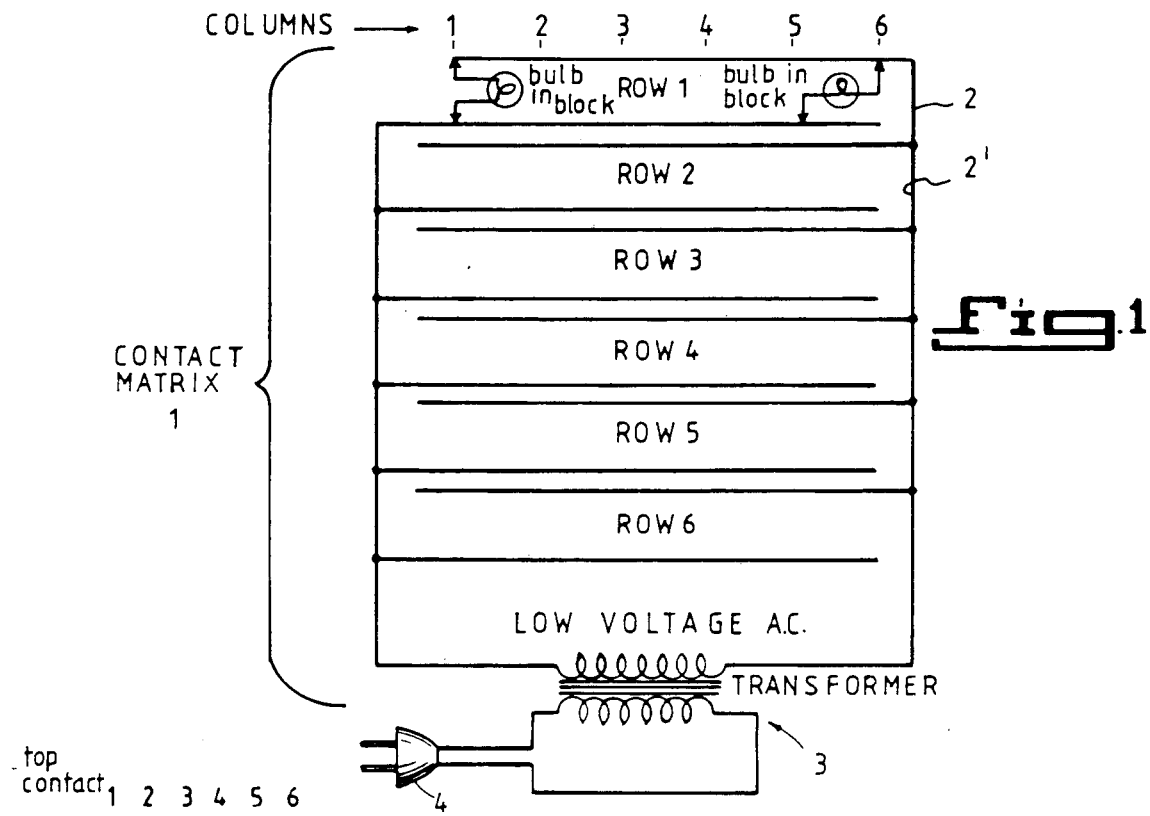
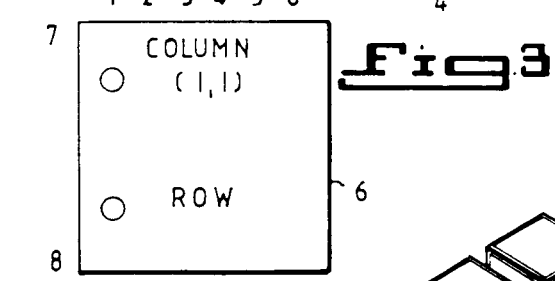
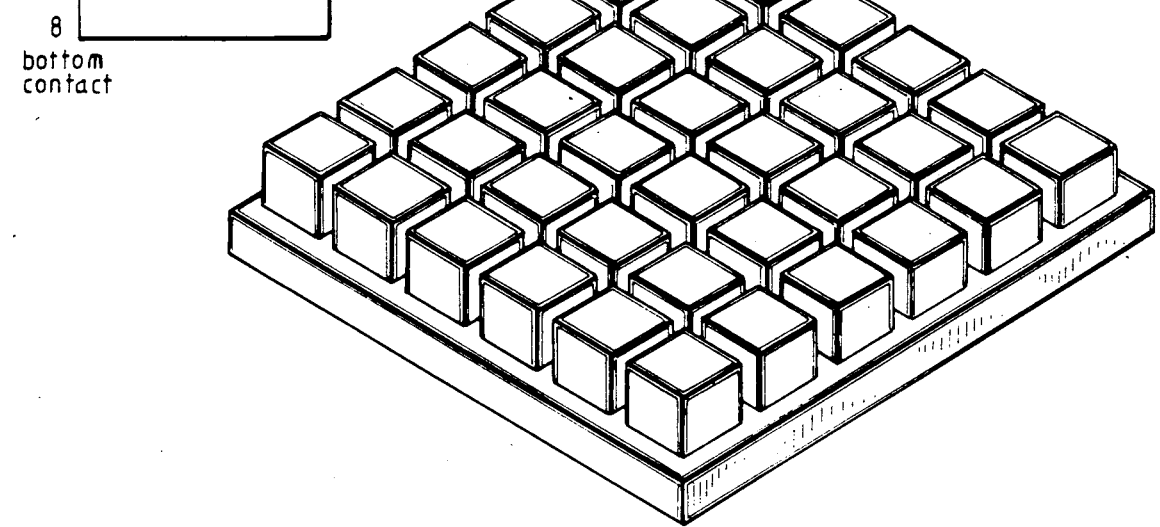

ILLUMINATED EDUCATIONAL BLOCKS

This invention relates to a decorative illuminated block set, and in particular, to a mounting apparatus having a matrix for mounting low voltage illuminated lights, so that the lights can be illuminated if placed in the proper position as to the proper order of the alphabet and numbers assigned to the blocks.

The invention provides an illuminated block set having individual low voltage incandescent lights within blocks mountable upon low voltage conductive strips which are interconnected in a matrix, together with a transformer for reducing electrical output to a low voltage range in the preferred embodiment.

In the alternative, a self enclosed battery can be supplied to permit the low voltage range. The supporting base comprises a matrix of low voltage high density conductive plastic or a laminated metallic conductor. The blocks may be placed at any position upon the matrix so that the blocks are engaged to the low voltage support matrix. In one embodiment of the device, the blocks will be held in place by vertically extending walls which correspond at the base of the walls to the shape of the matrix. In another embodiment, the blocks may be frictionally engaged to the conductive matrix.

Low voltage currents is provided by a transformer to the supporting matrix of conductors, or by the self enclosed battery.

In the preferred embodiment, the invention comprises individual blocks having incandescent lamps mountable within the blocks to clasps which frictionally engage to be mounted upon the conductors of the matrix. The conductors are electrically connected to a transformer for reducing the voltage to a low voltage range, preferably twelve (12) volts or less. In the alternative, a similar low voltage range is provided for self enclosed batteries.

In the matrix of the device, a plurality of parallel conductor supports are mounted horizontally within a base frame so that the incandescent blocks may be mounted throughout the frame to spell letters of the alphabet and short readings. The blocks may also signify number combinations. The blocks will fit within all of the spaces of the grid matrix but will only illuminate if placed in the proper position as to the proper order of the alphabet or numbers designated.

BACKGROUND OF THE INVENTION

Various educational block matrix devices have been provided so that a block illuminates when the block is properly located within a matrix. Such patents are found at 2,092,577, 2,424,169, 3,237,341, 3,484,984, 3,517,937, 3,654,710, 3,696,548, 4,321,768, 4,508,511, 4,556,393. In U.S. Pat. No. 4,508,511 (McQueen) the lamps provided are not removable. In U.S. Pat. No. 4,556,393 (Bolli) there is no educational value to the device. U.S. Pat. No. 2,424,169 (Hoffman) is basically an electrical sign with no provisions for coding. U.S. Pat. No. 3,517,937 (Glass) is basically a lighted jigsaw puzzle. In U.S. Pat. No. 3,654,710 (Barnard) the lamps are not removable. This is also the case in U.S. Pat. No. 4,321,768 (Englehardt) and U.S. Pat. No. 2,092,577 (Hornung). Hornung also does not have a positive coding. Furthermore, in U.S. Pat. Nos. 3,696,548 (Teller), 3,237,341 (Janning) and 3,484,984 (Fischer), illuminated building blocks are provided with no educational value. Furthermore, in U.S. Pat. No. 4,573,108 (Castiglia), a low voltage matrix is provided for frictional engagement of C-shaped lamps upon a plurality of parallel horizontal stems.

It is an object of the device to provide a coded matrix for educational blocks which illuminates the blocks if they are placed in the proper position.

A further object of the invention is to provide a low voltage educational illuminated block system.

SUMMARY OF THE INVENTION

The grid matrix contains two low voltage contact conductive strips running horizontally across the base board for each row of block postions. The contact strips are positioned such that they will contact every contact position for each contact row of the blocks.

Although this coding scheme is presently employed, other codes as may seem appropriate, will be employed.

The operating voltage is chosen as to not present potentials that could be dangerous to anyone using this system.

Construction materials could be any appropriate material such as plastic, wood, metal, etc. that will allow easy manufacturing and not be hazardous.

To prevent blocks from lighting in the wrong position, a mask is placed over the contact strips that have holes of sufficient diameter to allow the block contacts to freely pass through them. These holes are coded the same as the blocks, that is the top hole represents the column position and the bottom hole represents the row position.

An alternate version of the blocks will replace the alpha-numerics with pictures and the coding sheet in the grid matrix will be deleted so that the blocks will illuminate in any position.

The regular matrix could be replaced with a matrix of a different shape for example the matrix could be the face of a clock or any other interesting shape.

The Educational Fun Blocks consists of a set of alphabet and number blocks and a grid matrix. The blocks will fit in all the spaces of the grid matrix but will only illuminate if placed in the proper position as to the proper order of the alphabet and numbers.

The grid matrix is arranged in a row of six by column of six array allowing the thirty six combinations of alpha's and numbers.

To properly encode the blocks, two horizontal rows of contact positions are assigned a number from one to six. The top row has a contact installed in a position that represents its column position and the second row has a contact installed in a position that represents its row position. For example the first row of the grid matrix contains the letters A, B, C, D, E, F, the "A" block is in column one, row one and contacts will be installed in position one of the first contact row on the block and position one of the second contact row of the block. The "D" block is in column four row one and will have contacts installed in position four in the first contact row of the block and position one of the second contact row of the block.

BRIEF DESCRIPTION OF THE DRAWINGS

To better understand the invention, reference is made to the accompanying drawings which are offered by way of a sample and which are not to be taken as limiting the invention, taken together with the accompanying drawings in which;

FIG. 1 is a schematic view of the device showing the matrix.

FIG. 2 is a perspective view of the matrix.

FIG. 3 is a bottom view of a block used for the device.

DESCRIPTION OF THE PREFERRED EMBODIMENT

Referring to FIGS. 1-3, there is showing a matrix 1 having low voltage conductor strips 2 and 2 which are connected in series with a low voltage AC transformer for transforming voltage input at wall plug 4 to low voltage current. Power strips 5 comprise row 11 of the matrix 1. Further parallel conductor strips comprise horizontal rows 12, 13, 14, 15 and 16. These are intersected by columns 21, 22, 23, 24, 25 and 26 which are ranged vertically across the matrix. Horizontally extending walls 9 and 10 define enclosures for securely holding the block 6 within the matrix. Each of the blocks 6 is constructed to structurally fit within any of the enclosures defined by walls 9 and 10. However, each block is typically coded with a top contact and a bottom contact to reciprocally engage the contact strips 5 and 5, which are made of a conductive plastic or metallic strips so that the electrical current may be provided at a safe level. Transformer 3 is provided to prevent surges of electrical current above the safe level. Another embodiment of the invention, is a self enclosed battery which is to provide the power for the matrix. Strips 5 and 5 connected to electrical contacts 7 and 8 upon the bottom of block 6 when the block 6 is placed within the proper designated enclosure of matrix 1. In another embodiment of the device, the contacts may be provided in a clasp shape to engage upwardly extending strips. FIG. 1 shows the matrix wherein a plurality of parallel conductive strips are provided. In this manner letters of the alphabet or numbers may be written to provide short slogans, initials or number combinations for the user of the blocks. The assembly of blocks comprise blocks which will fit in all the spaces of the grid matrix but will only illuminate if placed in the proper position as to the proper order of the alphabet and numbers. The grid matrix 1 is arranged in a column of six array allowing the 36 combinations of alphabet symbols and numbers.

To properly encode the blocks 6 two horizontal rows of contact positions 7 and 8 are assigned a number from one to six, the top row having a contact installed in a position that represents its column position and a second row having a contact installed in a position that represents its row position. For example the first row of the grid matrix may contain the letters A B C D E and F. Therefore, the (A) block is in column 1 row 1 and contacts are installed in position 1 of the first contact row of the block 6 and position 1 of the second contact row of the block 6. Also the (D) block is in column 4 row 1 and has contacts installed in position 4 in the first contact row of the block and position 1 of the second contact row of the block.

As several specific embodiments of the present invention have been illustrated, it is to be understood that many changes and modifications thereof can be made without departing from the spirit of the invention as defined in the following claims.

What is claimed is:

1. An educational illuminated block assembly, comprising a support provided with conductive means coded so as to determine a plurality of conductive locations on said conductive means; said conductive means being connectable with an electric power supply; and a plurality of blocks each having illuminating means and also having contact means coded in correspondence with a respective one of said locations of said conductive means of said support, so that when a respective one of said blocks is placed on said support at a location such that said contact means of said block correspond to said location, electric current is supplied through said conductive means to said block and said block is illuminated, while when a respective one of said blocks is displaced on said support at a location such that said contact means of said block does not coincide to said location, electric current is not supplied from said conductive means to said block and said block is not illuminated.

2. An educational illuminated blocks assembly as recited in claim 1, wherein the conductive means comprise a grid matrix having two or more low voltage contact conductor strips running horizontally across a base.

3. An educational illuminated blocks assembly as recited in claim 2, additionally comprising corresponding electrical contacts located upon a surface of each of said blocks, said electrical contacts being engageable to correspondingly positioned contacts of conductors.

4. An educational illuminated blocks assembly as recited in claim 3, wherein the grid matrix is arranged in a plurality of rows of conductors by a plurality of columns in an array corresponding to encoded contacts upon the blocks.

* * * * *